US009598977B2

(12) United States Patent
Meyer et al.

(10) Patent No.: US 9,598,977 B2
(45) Date of Patent: Mar. 21, 2017

(54) SYSTEMS AND METHODS FOR BOUNDARY CONTROL DURING STEAM TURBINE ACCELERATION

(71) Applicant: General Electric Company, Schenectady, NY (US)

(72) Inventors: John Lawrence Meyer, Schenectady, NY (US); Carl R. Toth, Schenectady, NY (US); Dean Alexander Baker, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 687 days.

(21) Appl. No.: 14/072,404

(22) Filed: Nov. 5, 2013

(65) Prior Publication Data

US 2015/0125257 A1 May 7, 2015

(51) Int. Cl.
*F01D 17/06* (2006.01)
*F01D 17/08* (2006.01)
(Continued)

(52) U.S. Cl.
CPC .............. *F01D 19/00* (2013.01); *F01D 17/06* (2013.01); *F01D 17/08* (2013.01); *F01D 17/18* (2013.01);
(Continued)

(58) Field of Classification Search
CPC .......... F01D 17/06; F01D 17/08; F01D 17/18; F01D 19/00; G05B 15/02; F05D 2220/31;
(Continued)

(56) References Cited

U.S. PATENT DOCUMENTS 4,228,359 A * 10/1980 Matsumoto ............. F01K 7/165
290/40 R
4,267,458 A * 5/1981 Uram ..................... F01D 17/24
290/40 R
(Continued)

FOREIGN PATENT DOCUMENTS

EP          1826364 A1      8/2007

OTHER PUBLICATIONS

European Search Report and Opinion issued in connection with corresponding EP Application No. 14191489.5 on May 12, 2015.

*Primary Examiner* — Igor Kershteyn
(74) *Attorney, Agent, or Firm* — Eversheds-Sutherland (US) LLP (57) ABSTRACT

Certain embodiments of the disclosure may include systems and methods for boundary control during steam turbine acceleration. According to an example embodiment, the method can include receiving an indication the turbine is in an initial acceleration phase; receiving speed control parameter data from a plurality of sensors; receiving boundary control parameter data from a plurality of sensors; providing a control valve configured for controlling steam flow entering the turbine; determining the control valve position based on received speed control parameter data; determining the control valve position based on received boundary control parameter data; adjusting at least one boundary control parameter to the at least one boundary control parameter limit during turbine startup, wherein the value of a speed control parameter is simultaneously adjusted based on the adjusted at least one boundary control parameter; and adjusting the control valve position based at least on determined parameter data.

20 Claims, 6 Drawing Sheets

(51) Int. Cl.
*F01D 17/18* (2006.01)
*F01D 17/24* (2006.01)
*F01D 19/00* (2006.01)
*G05B 15/02* (2006.01)
*F01K 13/02* (2006.01)

(52) U.S. Cl.
CPC .............. *F01D 17/24* (2013.01); *F01K 13/02* (2013.01); *G05B 15/02* (2013.01); F05D 2220/31 (2013.01); F05D 2260/85 (2013.01); F05D 2270/04 (2013.01); F05D 2270/16 (2013.01); F05D 2270/17 (2013.01); F05D 2270/304 (2013.01); F05D 2270/44 (2013.01); F05D 2270/54 (2013.01); F05D 2270/708 (2013.01); F05D 2270/71 (2013.01)

(58) Field of Classification Search
CPC .............. F05D 2260/85; F05D 2270/04; F05D 2270/16; F05D 2270/304; F05D 2270/44; F05D 2270/54; F05D 2270/17; F05D 2270/708
See application file for complete search history.

(56) References Cited

U.S. PATENT DOCUMENTS

| | | | | |
|---|---|---|---|---|
| 4,320,625 A | * | 3/1982 | Westphal | F01D 19/02 60/646 |
| 4,329,592 A | * | 5/1982 | Wagner | F01D 19/00 290/40 R |
| 4,561,254 A | * | 12/1985 | Martens | F01K 9/04 290/40 C |
| 4,793,132 A | * | 12/1988 | Okabe | F01D 19/00 122/7 R |
| 5,361,585 A | * | 11/1994 | Westphal | F01K 7/24 60/646 |
| 6,939,100 B2 | * | 9/2005 | Kirchhof | F01D 19/02 415/1 |
| 2012/0151921 A1 | * | 6/2012 | Sathyanarayana | F01K 7/22 60/646 |
| 2012/0151925 A1 | | 6/2012 | Kluge et al. | |

* cited by examiner

SYSTEMS AND METHODS FOR BOUNDARY CONTROL DURING STEAM TURBINE ACCELERATION

TECHNICAL FIELD

Embodiments of the disclosure relate generally to control of a steam turbine, and in particular, to systems and methods for boundary control during steam turbine acceleration.

BACKGROUND

Steam turbines are commonly used in power plants, heat generation systems, marine propulsion systems, and other heat generation systems. Normal operation of a steam turbine can generally include three distinct phases: startup, rated-operation, and shutdown. In particular, during the start-up phase of turbine operation, the turbine rotor can accelerate from a partial full speed condition to the turbine's rated operational speed. Advancements in steam turbine design and operational usage during the start-up phase have sought to increase efficiency and operational flexibility, while decreasing the time needed to reach the rated-operation phase. However, due to complex interaction of control modes and system constraints, regulating turbine startup using turbine parameter boundary values may cause the turbine to exceed its physical and operational limits.

BRIEF DESCRIPTION OF THE DISCLOSURE

Some or all of the above needs and/or problems may be addressed by certain embodiments of the disclosure. Certain embodiments of the disclosure can include systems and methods for boundary control of a steam turbine during acceleration. According to an example embodiment of the disclosure, a method for controlling a steam turbine during acceleration can be provided. The method can include receiving an indication the turbine is in an initial acceleration phase; receiving speed control parameter data from a plurality of sensors; receiving boundary control parameter data from a plurality of sensors; providing a control valve configured for controlling steam flow entering the turbine; determining the control valve position based on received speed control parameter data; determining the control valve position based on received boundary control parameter data; adjusting at least one boundary control parameter to the at least one boundary control parameter limit during turbine startup, wherein the value of a speed control parameter is simultaneously adjusted based on the adjusted at least one boundary control parameter; and adjusting the control valve position based at least on determined parameter data.

According to another example embodiment, a system can be provided to control a steam turbine during acceleration. The system can include a turbine; a plurality of sensors operable to receive turbine speed control data and boundary control parameter data; and at least one control valve operable to adjust the control valve position and control steam flow entering the turbine. Further, the system can include a processor operable to receive turbine speed control data, boundary control parameter data, and wherein the processor is operable to determine the at least one control valve position based on the data received from the sensors' monitoring speed; determine control valve position based on the data received from the sensors' monitoring boundary control parameters; adjust at least one boundary control parameter to the at least one boundary control parameter limit during turbine startup, wherein the value of a speed control parameter is simultaneously adjusted based on the adjusted at least one boundary control parameter; and adjust the control valve position based at least on determined parameter data.

According to another example embodiment, a system can be provided to control a steam turbine during acceleration. The system can include one or more computer-readable media storing computer-executable instructions that, when executed by at least one processor, configure at least one processor to perform operations. Further, these computer-executable instructions can be configured to receive an indication the turbine is in an initial acceleration phase; receive speed control parameter data from a plurality of sensors; receive boundary control parameter data from a plurality of sensors; provide a control valve configured for controlling steam flow entering the turbine; determine the control valve position based on received speed control parameter data; determine the control valve position based on received boundary control parameter data; adjust at least one boundary control parameter to the at least one boundary control parameter limit during turbine startup, wherein the value of a speed control parameter is simultaneously adjusted based on the adjusted at least one boundary control parameter; and adjust the control valve position based at least on determined parameter data.

Other embodiments, features, and aspects of the disclosure are described in detail herein and are considered a part of the claimed disclosure. Other embodiments, features, and aspects can be understood with reference to the following detailed description, accompanying drawings and claims.

BRIEF DESCRIPTION OF THE DRAWINGS

The detailed description is set forth with reference to the accompanying drawings, which are not necessarily drawn to scale.

DETAILED DESCRIPTION OF THE DISCLOSURE

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Certain embodiments of the disclosure can include systems and methods for boundary control during steam turbine acceleration. The startup phase of steam turbine operation can accelerate the steam turbine rotor from a partial full speed condition to an operational rated speed. Conventional strategy for controlling acceleration has usually involved ramping to a reference speed at a fixed rate and controlling speed proportionally to that reference speed. The fixed acceleration rate can be relatively conservative so as not to approach any machine boundary. However, this conventional strategy can result in a longer than necessary time to reach the rated operational speed. One technical effect of certain embodiments of the disclosure can accelerate the steam turbine to a rated operational speed in a relatively shorter time period, while minimizing excessive turbine speed. Another technical effect may allow for undisturbed turbine operation during transitions between control modes during acceleration.

Figure 1:
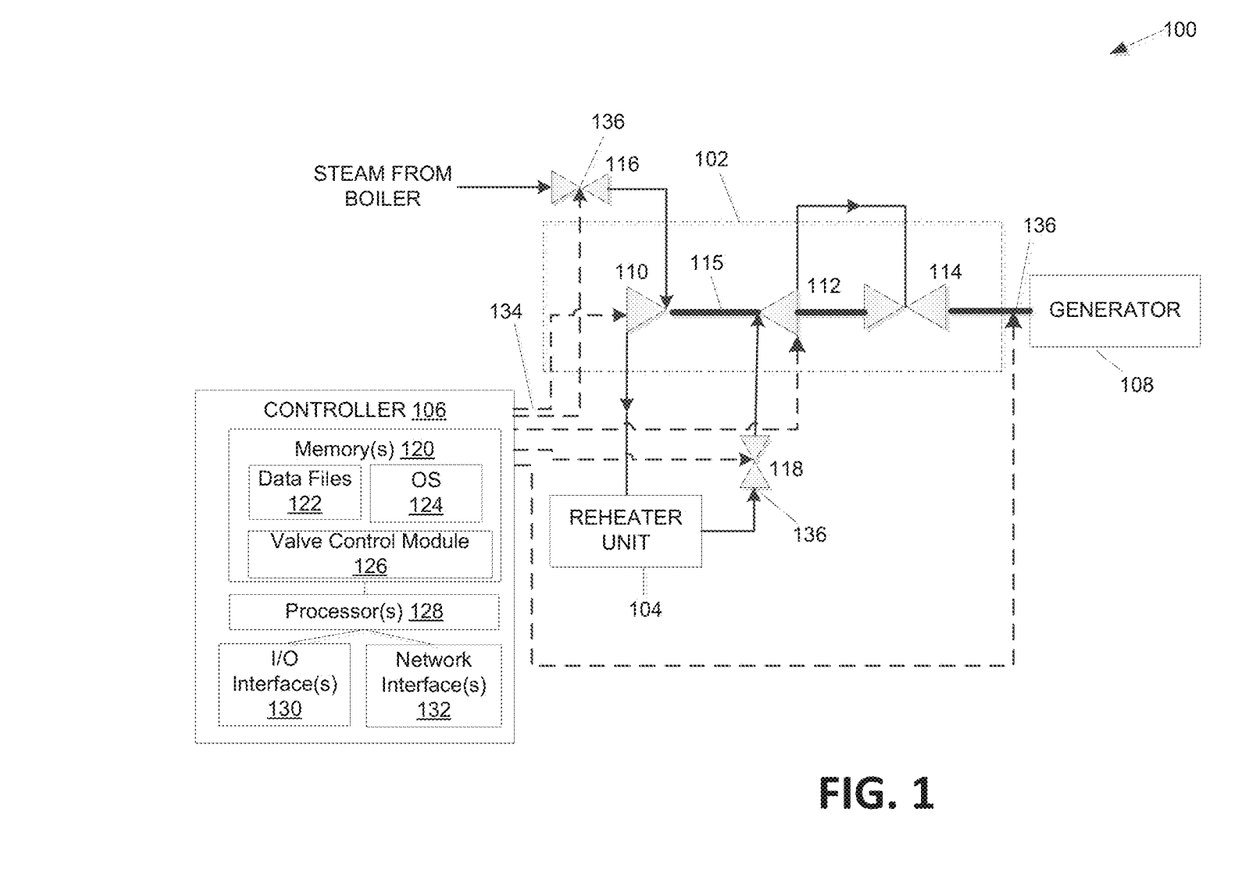
FIG. 1 is a schematic illustrating an example power plant environment according to an embodiment of the disclosure.

Referring now to the figures, where the various numbers represent like elements through the several views, FIG. 1 is a schematic illustrating an example steam turbine 102 deployed in an environment 100, such as, but not limited to, a power plant site. FIG. 1 illustrates the environment 100 having the steam turbine 102 which can include a reheater unit 104, a control system 106, and a generator 108, in accordance with an embodiment of the disclosure.

As illustrated in FIG. 1, the steam turbine 102 may include a first section 110 and a second section 112. In various embodiments of the disclosure, the first section 110, and the second section 112 of the steam turbine 102 may be a high pressure (HP) section 110, an intermediate pressure (IP) section 112. In various other embodiments of the disclosure, the HP section 110 may also be referred to as a turbine shell 110 and the IP section 112 may also be referred to as an additional turbine shell 112. Further, the steam turbine 102 may also include a third section 114. In an embodiment of the disclosure, the third section 114 may be a low pressure (LP) section 114. The steam turbine 102 may also include a rotor 115, which may be disposed within the first, second and third sections 110, 112 and 114 of the steam turbine 102. In an embodiment of the disclosure, a flow path around the rotor 115 may allow the steam to fluidly communicate between the HP section 110 and the IP section 112.

As illustrated in FIG. 1, the steam turbine 102 may include a first valve 116 and a second valve 118 for controlling the steam flow entering the first section 110 and the second section 112, respectively. In various embodiments of the disclosure, the first valve 116 and the second valve 118 may be a control valve 116 and an intercept valve 118 for controlling the steam flow entering the HP section 110 and the IP section 112, respectively.

During the operation of the steam turbine 102, steam extracted from the HP section 110 may flow through the reheater unit 104 where the temperature of the steam is raised before flowing into the IP section 112. Subsequently, the steam may be extracted from the reheater unit 104, via the intercept valve 118, and flow into the IP section 112 and the LP section 114, as illustrated in FIG. 1. The steam may exit work the IP section 112 and the LP section 114, and flow into a condenser.

The system 100 may further include at least one controller 106 or suitable control system. The controller 106 may be operable to control a steam turbine during acceleration. For example, a plurality of connections, such as 134, may facilitate communications between the controller 106 and various sensors, such as 136, included in the system, wherein the sensors 136 can be configured to receive operational parameter data. A wide variety of suitable connections may be utilized to facilitate communication with the sensors 136, for example, direct network connections, local area network connections, wide area network connections, Internet connections, Bluetooth™ enabled connections (trademark owned by BLUETOOTH SIG, INC.), radio frequency network connections, cellular network connections, any suitable wired connections, any suitable wireless connections, and/or any suitable combinations of connections.

With continued reference to FIG. 1, the controller 106 may be a suitable processor driven device that is capable of boundary control during steam turbine acceleration. Examples of suitable controllers include, but are not limited to: application specific circuits, microcontrollers, minicomputers, personal computers, servers, other computing devices and the like. In certain embodiments, the controller 106 may be incorporated into a supervisory command and data acquisition (SCADA) system associated with a turbine, power source, and/or power plant. The controller 106 may include any number of processors 128 that facilitate the execution of computer-readable instructions to control the operations of the controller 106.

In addition to one or more processor(s) 128, the controller 106 may include one or more memory devices 120, one or more input/output ("I/O") interfaces 130, and one or more network interfaces 132. The one or more memory devices 120 or memories may be any suitable memory devices for example, caches, read only memory devices, random access memory devices, magnetic storage devices, etc. The one or more memory devices 120 may store data, executable instructions, and/or various program modules utilized by the controller 106, for example, data files 122, an operating system 124, and/or a valve control module 126. The data files 122 may include stored data associated with the operation of the machine and stored data associated with the system 100.

In certain embodiments of the disclosure, the controller 106 may include any number of software applications that are executed to facilitate the operations of the controller 106. The software applications may include computer-readable instructions that are executable by the one or more processors 128. The execution of the computer-readable instructions may form a special purpose computer that facilitates boundary control during steam turbine acceleration. As an example of a software application, the controller 106 may include an operating system ("OS") 124 that controls the general operation of the controller 106 and that facilitates the execution of additional software applications. The controller 106 may also include a valve control module 126 that is operable to determine speed control and boundary control parameters during steam turbine acceleration. For example, the valve control module 126 may determine the flow of steam required to support the boundary parameter requirement, and the valve control module 126 may send an adjusting signal through one or more connections 134 to respective valves, such as 116 and 118. Additionally, although the valve control module 126 is illustrated in FIG. 1 as a single component, the operations of the valve control module 126 may be performed by any number of components, applications, and/or software modules as desired in various embodiments of the disclosure.

The one or more I/O interfaces 130 may facilitate communication between the controller 106 and one or more input/output devices, for example, a universal serial bus port, a serial port, a disk drive, a CD-ROM drive, and/or one or more user interface devices, such as a display, keyboard, keypad, mouse, control panel, touch screen display, microphone, etc. that facilitate user interaction with the controller 106. The one or more I/O interfaces 130 may be utilized to receive or collect data and/or user instructions from a wide variety of input devices. Received data may be processed by the controller 106 as desired in various embodiments of the disclosure and/or stored in the one or more memory devices 120.

As desired, embodiments of the disclosure may include a system 100 with more or less than the components illustrated in FIG. 1. Additionally, certain components of the system 100 may be combined in various embodiments of the disclosure. The example system 100 shown in FIG. 1 is provided by way of example only. Numerous other operating environments, system architectures, and device configurations are possible. Accordingly, embodiments of the disclosure should not be construed as being limited to any particular operating environment, system architecture, or device configuration.

Figure 2:
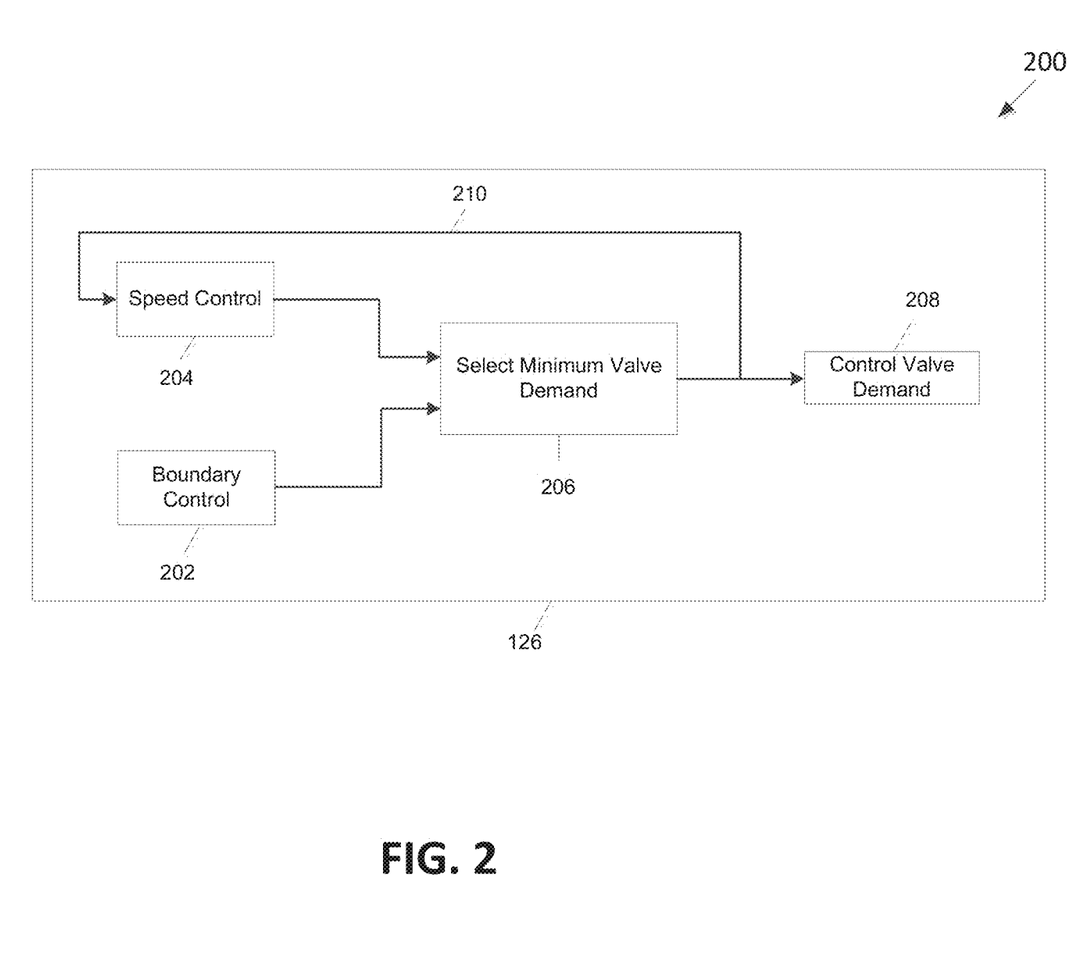
FIG. 2 is a block diagram of an example control data flow for a system employed in controlling a steam turbine during acceleration according to an embodiment of the disclosure.

FIG. 2 is an example control flow diagram 200 for a system employed in controlling a steam turbine during acceleration according to an embodiment of the disclosure. In this embodiment, the control flow can be implemented in a valve control module, such as 126. The interacting control modes can include, but are not limited to, speed control mode 204 and boundary control mode 202. In their respective control blocks, the speed control algorithm and turbine parameter boundary control algorithm can each determine a control valve demand 208. The control valve demand 208 can be the flow of steam through a control valve, such as 116 in the system 100 of FIG. 1, needed to meet the requirements determined by the respective control blocks. In the embodiment shown, requirements from the speed control block 204 and the boundary control block 202 can feed into the select minimum valve demand comparator block 206. At comparator block 206, a minimum value determination can be made between the steam flow requirements determined in the speed control block 204 and the boundary control block 202. The output from the comparator block 206 can feed into the control valve demand 208, which can subsequently adjust the control valve 116 based on the demand block 208 signal. In addition to input to the control valve demand 208, output of the comparator block 206 can provide a feedback signal 210 into the speed control block 204. The feedback signal 210 can provide additional regulation and/or adjustment of the determined valve demand generated by the speed control algorithm.

Figure 3:
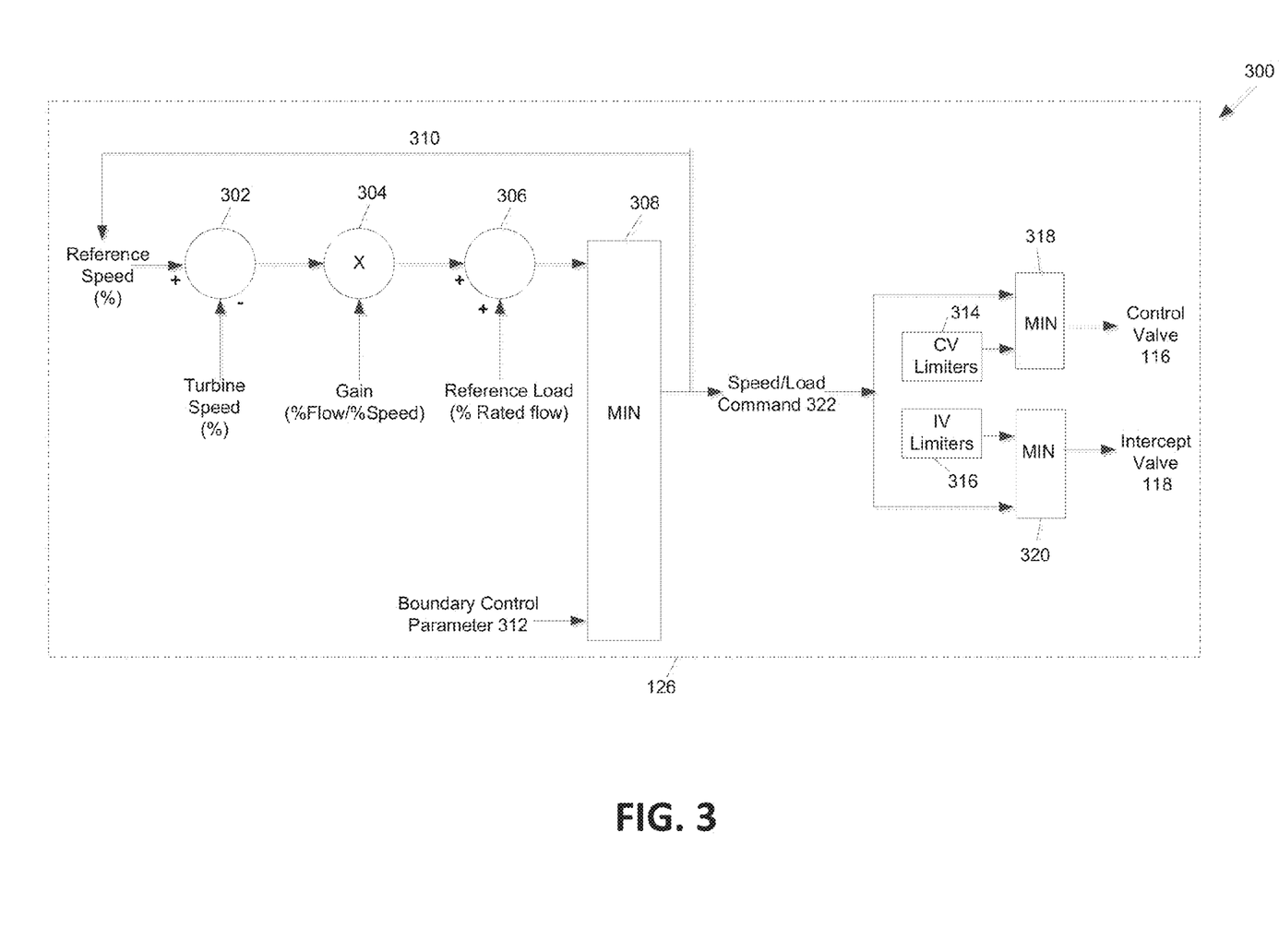
FIG. 3 is an exemplary block diagram of an example control flow diagram for a system employed in controlling a steam turbine during acceleration according to an embodiment of the disclosure.

FIG. 3 is another example control flow diagram 300 for a system employed in controlling a steam turbine during acceleration according to an embodiment of the disclosure. As illustrated in FIG. 3, turbine speed and boundary parameters can be input to a valve control module, such as 126 in the system 100 of FIG. 1, and analyzed for an adjustment to the turbine speed. For example, a comparator block 302 can generate an error signal after comparing the actual speed of the steam turbine with a reference speed of the steam turbine. In one embodiment, the reference speed signal and actual speed can be calculated as percentages of the rated operational speed. In another embodiment, the error signal generated in comparator block 302 can be calculated in percent error units, which is the percent difference between the reference speed and actual speed.

A multiplier block 304 can receive the output of the comparator block 302. Here, the error signal can be multiplied with a gain to generate an error regulation signal. In another embodiment, this gain constant can be used to convert signal units between percent speed or percent error into percent-flow based units. This gain signal can establish a relationship between the error signal and the current load of the steam turbine 102 of FIG. 1. A summing junction 306 can receive the output of the multiplier block 304 and a turbine reference load. The summing junction 306 can generate a flow reference signal.

In one embodiment, turbine boundary control parameter inputs 312 may feed into comparator block 308. The boundary parameters may include, but are not limited to, axial thrust, rotor stress, steam pressure, temperature, flow rate, or combinations thereof. In addition, the comparator block 308 can receive the output of the summing junction 306. The comparator block 308 can compare the input signals and output the most limiting (minimum) value of the input signals. In another embodiment, the comparator block 308 may output the maximum input signal or another user-determined evaluator. In either case, the comparator block 308 output may be considered the speed/load command 322. The speed/load command 322 can provide a feedback signal 310 into the comparator block 302. The feedback signal 310 can provide additional regulation and/or adjustment of the determined control valve demand generated by the speed control algorithm.

As illustrated in FIG. 3, flow limiters 314 and 316, which can limit the steam flow into the respective sections 110, 112, based at least in part on at least one determined operational parameter, can be included in the controller 106 of FIG. 1. The flow limiter 314 may be a control valve flow limiter (hereinafter referred to as "CV flow limiter") for limiting steam flow in the HP section 110. The flow limiter 316 may be an intercept valve flow limiter (hereinafter referred to as "IV flow limiter") for limiting steam flow in the IP section 112 of FIG. 1. In other embodiments, the CV flow limiter 314 may also include limiter modules that employ transfer function algorithms. In another embodiment, the IV flow limiter 316 may also employ transfer function algorithms. The transfer function algorithm may be configured to independently control the steam flow into the HP section 110 of FIG. 1 and/or the IP section 112 of the steam turbine 102 of FIG. 1. In an embodiment of the disclosure, the transfer function algorithm may also limit the steam flow based on at least one of a transient condition, the condition of the power plant, or a physical requirement.

In the embodiment shown in FIG. 3, the controller 106 may also include comparator blocks 318 and 320 for selecting a minimum value between the speed/load command 322 and the flow limiter's 314 and 316 output. Similar to the comparator block 308, the comparator blocks 318, 320 may be used to evaluate a maximum value or a user-determined output from the received inputs. The controller 106 may determine the demand for the valves, such as 116, 118, based on the output from the comparator blocks 318, 320. In another embodiment, the signal output from comparator blocks 318 and 320 can provide a feedback signal 310 into the reference speed input into comparator block 302.

Figure 4:
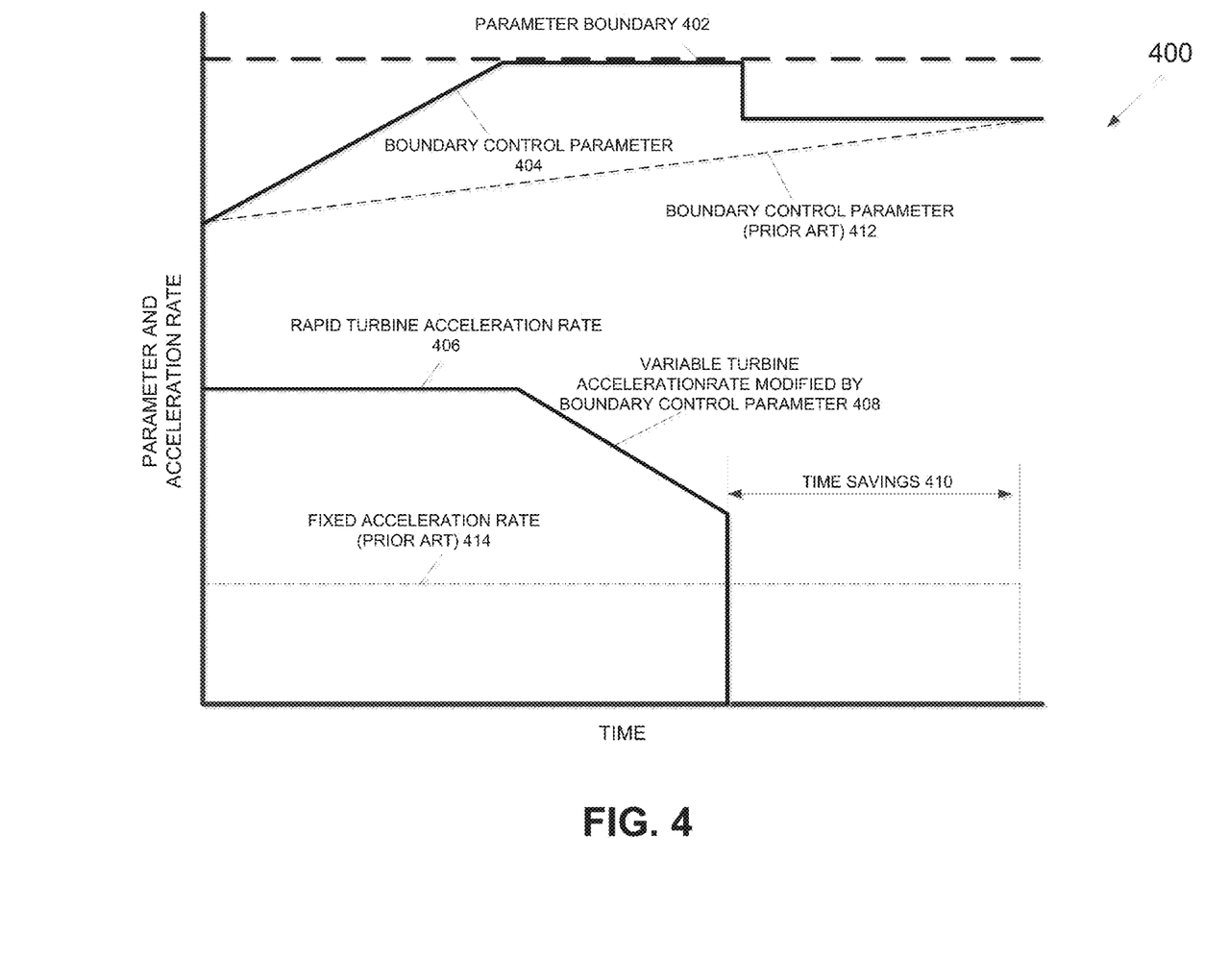
FIG. 4 is an example graphic of a turbine speed response and an exemplary turbine boundary control parameter response for a conventional control strategy compared to a control strategy according to an embodiment of the disclosure.

FIG. 4 shows an example graphic of a turbine speed response and an exemplary turbine boundary control parameter response over time for a conventional control strategy compared to a control flow in accordance with an embodiment of the disclosure. In a conventional control strategy, the boundary control parameter 412 can be slowly increased over an extended period of time. Simultaneously, the turbine speed may accelerate to a reference speed at a fixed rate 414, wherein the speed can be controlled proportionally to the reference speed. As a result, the turbine, such as 102 in FIG. 1, may also need an extended period to reach the rated speed.

Another result of the conventional control strategy is that there may be no interaction between the limiting requirements of the turbine's operational parameters and the requirement imposed through speed control. Thus, when the boundary control requirement no longer yields the limiting value in comparison to the speed control requirement, the transition to speed control may cause a system malfunction.

With regards to the disclosure, the turbine acceleration may be controlled by two modes, boundary control 202 and speed control 204. In contrast to conventional control strategy, the boundary control parameter 404 can be rapidly increased to a respective parameter boundary 402. The parameter boundary 402 can be a physical or operational limitation that should not be exceeded. Using the boundary control 202, the boundary control parameter 404 can be increased towards the parameter boundary limit 402, and the turbine speed may also accelerate rapidly 406 as a function of the boundary control parameter 404.

As depicted in FIG. 4, the rapid turbine acceleration rate 406 can be a constant value. In another embodiment, the rapid turbine acceleration rate 406 may variably increase. FIG. 4 shows that once the boundary control parameter 404 reaches the parameter boundary 402, the turbine acceleration 408 may begin to decrease. The decreasing acceleration may be a function of a requirement change in the amount of steam needed to enter the control valve 116 or the intercept valve 118.

For example, thrust may configured as the boundary control parameter 404 that determines the requirements change. During acceleration, the turbine 102 may be accelerated to the thrust machine boundary. Accordingly, the control valve 116 associated with the turbine 102 can be adjusted to compensate for the speed needed to meet this thrust value. Thus, the rapid acceleration to the thrust boundary may subsequently cause the need to decrease the turbine acceleration 408 so damage to the turbine 102 does not occur. As the system continues to operate at the thrust parameter boundary 402, the turbine 102 may continue to accelerate until it reaches the rated speed. FIG. 4 also shows that there can be a time savings 410, which can provide a cost benefit.

Figure 5:
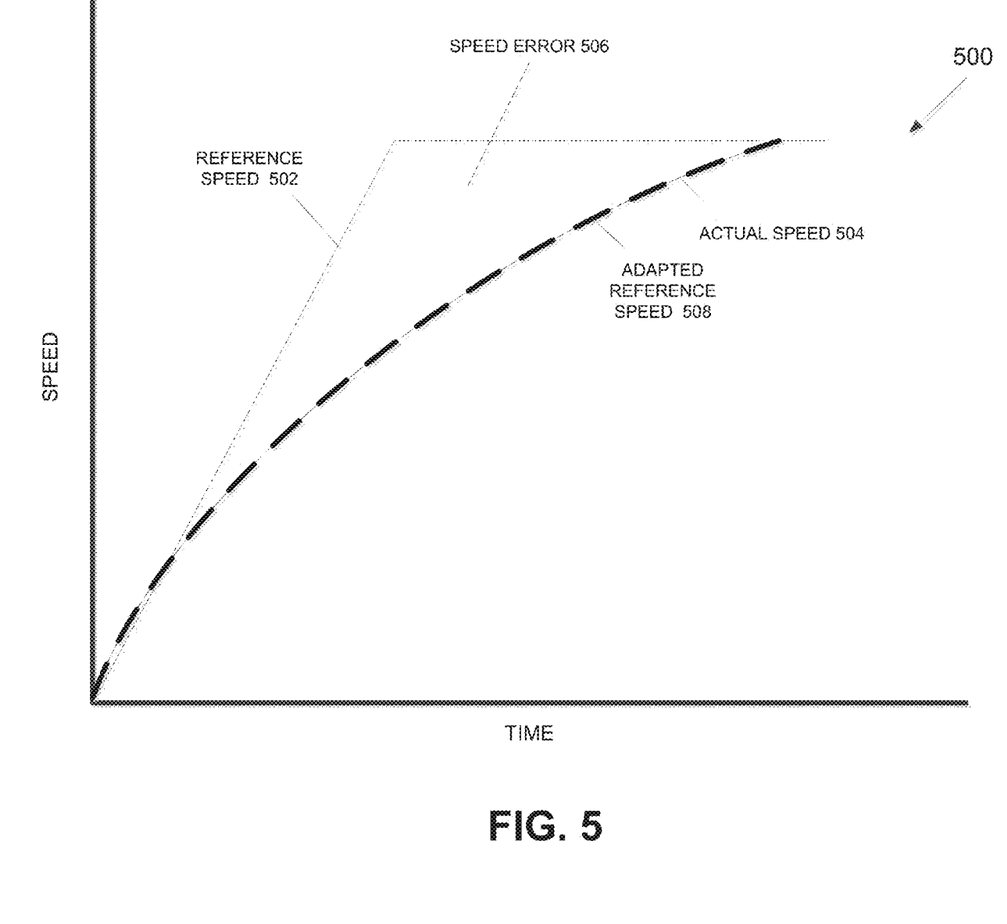
FIG. 5 is an example graphic of a response per unit time of the turbine speed for a conventional control strategy compared to a control strategy according to an embodiment of the disclosure.

FIG. 5 shows an example graphic of a response per unit time of the turbine speed for a conventional control strategy compared to a control strategy in accordance with an embodiment of the disclosure. While operating under a conventional control strategy, the turbine, such as 102 in FIG. 1, may accelerate solely under a mode, such as speed control, shown as 204 in FIG. 2, and the reference speed 502 accelerates at a predetermined rate to reach the rated speed. During system evaluation, the reference speed 502 can be compared to the actual speed 504. The difference between the reference speed 502 and the actual speed 504 can be the speed error 506. The speed error 506 can drive the system to make an adjustment to reduce the error. Thus, an excessive speed error 506 can increase the valve demand beyond allowable constraints.

In contrast to conventional control strategy, the disclosed embodiment may initially operate in a mode, such as boundary control, shown as 202 in FIG. 2, wherein the respective boundary control parameter, similar to 404 in FIG. 4, can also regulate adjustments to the reference speed 502. The reference speed 502 can be adjusted through the feedback signal, such as 310 in FIG. 3, to output an adapted reference speed 508. Accordingly, the speed error 506 between the adapted reference speed 508 and actual speed 504 can be minimized. In certain instances during turbine acceleration, the requirement signal generated by the boundary control mode 202 may no longer be controlling, and the turbine speed can be controlled by the speed control mode 204. Thus, during transition between control modes (202, 204), the adapted reference speed 508 can minimize or otherwise prevent the transition between the control modes from being an abrupt transition because the demand generated by the speed control mode 204 can be tracked to the actual acceleration rate initiated by the boundary control mode 202.

Figure 6:
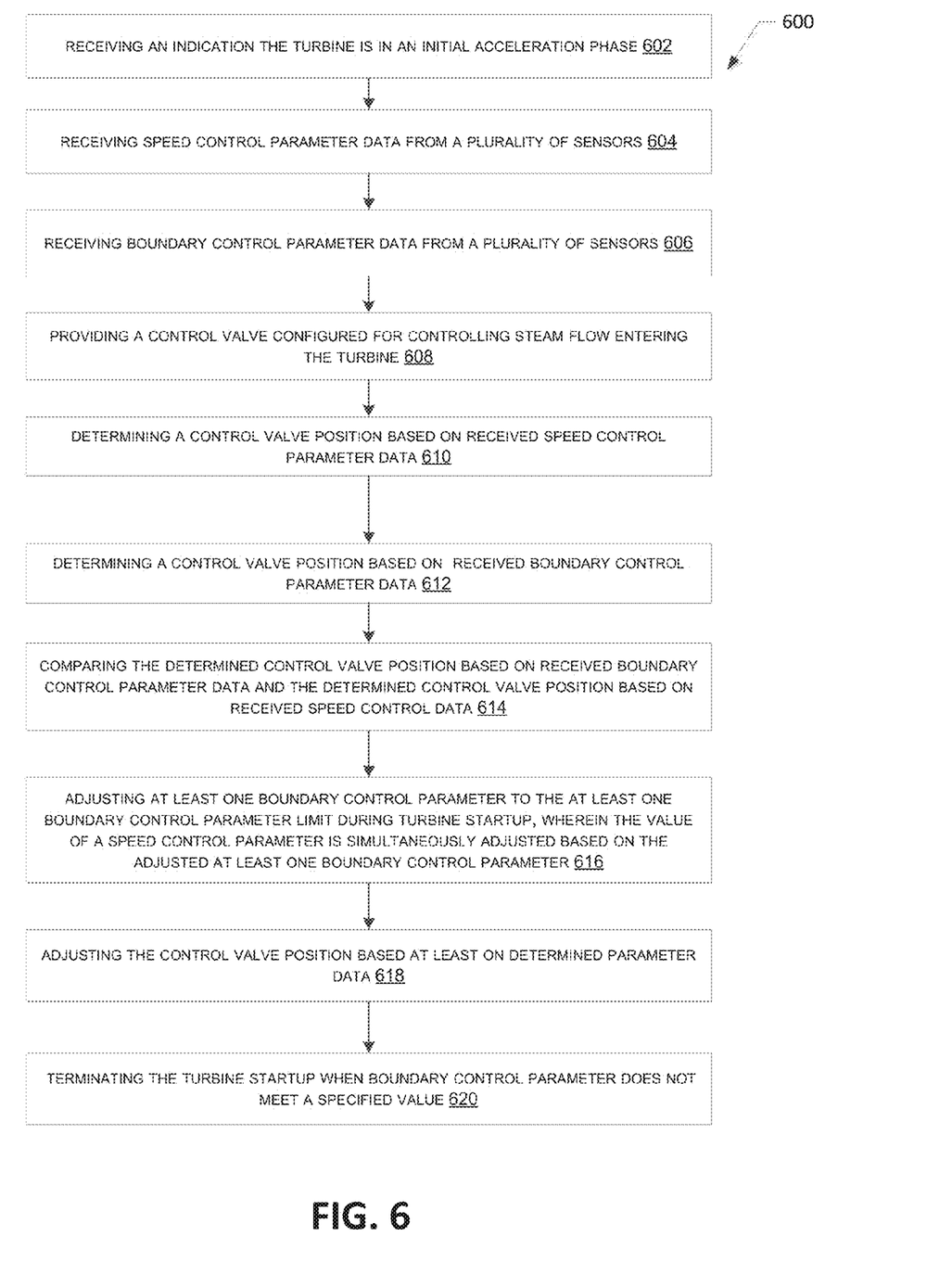
FIG. 6 is a flowchart for illustrating an example method for controlling the steam flow entering a steam turbine during acceleration according to an embodiment of the disclosure.

FIG. 6 is a flowchart for illustrating an example method for controlling the steam flow entering a steam turbine during acceleration according to an embodiment of the disclosure. The method 600 can be implemented using a system, such as 100 in FIG. 1. The operations described and shown in the method 600 of FIG. 6 may be carried out or performed in any suitable order as desired in various embodiments of the disclosure. Additionally, in certain embodiments, at least a portion of the operations may be carried out in parallel. The method 600 can start in block 602, and can include receiving an indication the turbine is in an initial acceleration phase. In block 604, the method 600 can include receiving speed control parameter data from a plurality of sensors. In block 606, the method 600 can include receiving boundary control parameter data from a plurality of sensors. In block 608, the method 600 can include providing a control valve configured for controlling steam flow entering the turbine. In block 610, the method 600 can include determining a control valve position based on received speed control parameter data. In block 612, the method 600 can include determining a control valve position based on received boundary control parameter data. In block 614, the method 600 can include comparing the determined control valve position based on received boundary control parameter data and the determined control valve position based on received speed control data. In block 616, the method 600 can include adjusting at least one boundary control parameter to the at least one boundary control parameter limit during turbine startup, wherein the value of a speed control parameter is simultaneously adjusted based on the adjusted at least one boundary control parameter. In block 618, the method 600 can include adjusting the control valve position based at least on determined parameter data. In block 620, the method 600 can include terminating the turbine startup when boundary control parameter does not meet a specified value.

In one embodiment, the method 600 can include adjusting the control valve position based at least on comparing the minimum value of the determined control valve position. In another embodiment, adjusting the control valve position can be determined by the speed control parameter wherein the boundary control parameter is not limited by physical or operational constraint.

In one embodiment, the speed control parameter can be determined by a comparison between the actual speed and reference speed. In another embodiment, the boundary control parameter may be based at least in part on a physical requirement. In an embodiment, the boundary control parameters can include at least one of: axial thrust, rotor stress, steam pressure, or physical range.

In other example embodiments of the disclosure, the method 600 can include fewer or greater numbers of operations than those described above, and may be performed in a different sequential order than described above.

An example of determining boundary control parameters during steam turbine acceleration is described below. As discussed earlier, FIG. 3 is an exemplary block diagram detailing the generation of the demand signal for the valves 116, 118. The valve demand can be based at least in part on various inputs received from the sensors 136. In an example embodiment, turbine acceleration during startup can be controlled by the limiting values of operational parameters that regulate continuous adjustments to the turbine acceleration rate. Further, the acceleration rate can be a response to the flow of steam entering the turbine. The evaluations made at the minimum requirements blocks (308, 318, and 320) can determine the control signal impacting steam flow through the valves 116, 118. The turbine acceleration rate can be established using, for example, a series of equations with one or more of the variables included in Table 1 below:

TABLE 1

Acceleration rate algorithm variables

| Variable | Definition |
| --- | --- |
| TN_LD | Speed/Load position (control valve position) |
| TN_LD$_{Target(\%err)}$ | Speed/Load target in % error terms |
| TNR | Reference Speed |
| TNR$_{Target(\%err)}$ | Reference Target Speed in % error terms |
| TNR$_{Z-1}$ | Reference Speed from previous frame |
| TNH | Actual Speed |
| TNHE | Speed Error |
| TNHE$_{Target}$ | Target Speed Error |
| IVL_ACC | Boundary Control Limiter Reference |
| KTN_CVRG | Speed Error Gain |
| LDR | Reference Load |

In order to respond to the signal sent by the turbine controller 106, the turbine 102 can accelerate, decelerate, or maintain a constant speed. The turbine response can be accomplished by increasing or decreasing the amount of steam entering the turbine 102 at the control valve 116 or intercept valve 118. Per Table 1, the speed/load position (TN_LD) can represent a steam admission valve flow position requirement determined by the minimum selected requirement between multiple flow position requirements. In one embodiment, the value of the speed/load position can be based on a percentage of a flow rate. During startup, the turbine can initially accelerate at a predetermined rate to produce acceleration of the turbine to the rated operational speed. The resultant speed of the predetermined rate can be the reference speed (TNR). The difference between the reference speed (TNR) and actual speed (TNH) can be calculated as the speed error (TNHE).

During startup, the controlling algorithm can determine target values of respective variables detailed in Table 1 to ensure that the resultant speed and load of the turbine 102 adjusts to the operational parameter boundary values. As shown in Equation 1 below, the Speed/Load target value (TN_LD$_{Target}$) can represent the Speed/Load valve position required to adjust to the parameter boundary value.

$$\text{TN\_LD}_{Target} = \frac{\text{Limiter Saturation (\% Flow)} + \text{IVL\_ACC(\% Flow)}}{\text{KTN\_CVRG}} \quad (1)$$

With regard to Equation 1 above, a limiting boundary value parameter can be represented by IVL_ACC. Limiter Saturation can represent a bias above the limiting boundary value parameter that the Speed/Load (TN_LD) should adjust. In another embodiment, this bias value can be relatively small to increase the operational efficiency of limiter mechanisms 314, 316. Further, these limiter mechanisms 314, 316 can limit the flow through the control valve 116 or the intercept valve 118. KTN_CVG can represent a proportional gain constant. In one embodiment, the gain constant can be used to convert between percent-error based variables and percent-flow based terms. In another embodiments, the controller 106 can be configured to determine the gain using combinations of a proportional-integral-derivative (PID) controller algorithm, such as, but not limited to, proportional-integral (PI), proportional-derivative (PD), proportional (P), integral (I), or proportional-integral-derivative (PID) configuration.

Equations 2 and 3 below both represent example values of the target speed error (TNHE$_{Target}$). As discussed earlier, the speed error (TNHE) can be the difference between the reference speed (TNR) and actual speed (TNH). Thus, the target speed error (TNHE$_{Target}$) can equate to the difference of the target reference speed (TNR$_{Target}$) and the actual speed (TNH), shown in Equation 2.

$$TNHE_{Target} = TNR_{Target} - TNH \quad (2)$$

The second equation for target speed error (TNHE$_{Target}$), shown in Equation 3, can equal the difference between the target speed/load valve position (TN_LD$_{Target}$), and the quotient of the reference load (LDR) and proportional gain constant. In one embodiment as shown in FIG. 2, the reference load can be used as a speed control integrator and summed with the speed error gain (KTN_CVRG) to produce the steam admission valve requirement evaluated in a minimum requirements block 308.

$$TNHE_{Target} = \text{TN\_LD}_{Target} - \frac{LDR}{\text{KTN\_CVRG}} \quad (3)$$

By setting Equation 2 and 3 equal to each other, the variables can be manipulated to establish a formula representing a value for the target reference speed (TNR$_{Target}$), shown in Equation 4 below.

$$TNR_{Target} = \text{TN\_LD}_{Target} - \frac{LDR}{\text{KTN\_CVRG}} + TNH \quad (4)$$

A value for the reference speed can also be determined using the sum of an adjustment value and a previous reference speed (TNR$_{Z-1}$), determined from a previous execution of all control logic of the turbine controller 106, as shown in Equation 5 below.

$$TNR_{Target} = \text{Adjustment} + TNR_{Z-1} \quad (5)$$

By setting equations 4 and 5 equal to each other, the variables can be manipulated to determine an adjustment, shown in Equation 6 below. The adjustment can represent the acceleration that the turbine must operate to meet the requirements of the algorithm.

$$\text{Adjustment} = \text{TN\_LD}_{Target} - \frac{LDR}{\text{KTN\_CVRG}} + TNH - TNR_{Z-1} \quad (6)$$

The adjustment can then be converted to an acceleration rate, as shown in Equation 7 below. In an embodiment, the acceleration rate can be determined by dividing the adjustment by the rate of control frame execution. The control frame execution rate (CFR) can be the period of once-through execution of all control logic within the controller 106. In an embodiment, the period to execute a control logic operation can be about 40 milliseconds (0.04 second).

$$\text{Acceleration Rate } (\%/\text{sec}) = \frac{1}{CFR}\left(\text{TN\_LD}_{Target} - \frac{LDR}{\text{KTN\_CVRG}} + TNH - TNR_{Z-1}\right) \quad (7)$$

As the boundary value parameters fluctuate during the startup phase of the turbine operation, the resultant acceleration rate can be determined. The controller 106 can send an adjusting signal to the turbine 102 based on the determined acceleration rate.

The disclosure is described above with reference to block and flow diagrams of systems, methods, apparatus, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the disclosure has been described in connection with what is presently considered to be the most practical of various embodiments, it is to be understood that the disclosure is not to be limited to the disclosed embodiments, but on the contrary, is intended to cover various modifications and equivalent arrangements included within the spirit and scope of the appended claims.

This written description uses examples to disclose the disclosure, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed disclosure is:

1. A method for starting a turbine, the method comprising:
   receiving an indication the turbine is in an initial acceleration phase;
   receiving speed control parameter data from a plurality of sensors;
   receiving boundary control parameter data from a plurality of sensors;
   providing a control valve configured for controlling steam flow entering the turbine;
   determining the control valve position based on received speed control parameter data;
   determining the control valve position based on received boundary control parameter data;
   adjusting at least one boundary control parameter to the at least one boundary control parameter limit during turbine startup, wherein the value of a speed control parameter is simultaneously adjusted based on the adjusted at least one boundary control parameter; and
   adjusting the control valve position based at least on determined parameter data.

2. The method of claim 1, further comprising: comparing the determined control valve position based on received boundary control parameter data and the determined control valve position based on received speed control data.

3. The method of claim 2, wherein comparing the determined control valve position based on received boundary control parameter data and the determined control valve position based on received speed control data, the comparison resultant is determined by the minimum value of the determined control valve positions.

4. The method of claim 1, wherein adjusting the control valve position based at least on determined parameter data is determined by the speed control parameter determined independently from the boundary control parameter data.

5. The method of claim 1, wherein adjusting the control valve position based at least on determined parameter data, wherein the determined parameter data can include: the determined control valve position based on received boundary control parameter data, the adjusted at least one boundary control parameter, determined control valve position based on received speed control parameter data, and the adjusted speed control parameter.

6. The method of claim 1, wherein the speed control parameter is determined by a comparison between the actual speed and reference speed.

7. The method of claim 1, wherein the boundary control parameter is based at least in part on a physical requirement or operational limit of the turbine.

8. The method of claim 7, wherein the boundary control parameters comprises at least one of: axial thrust, rotor stress, steam pressure, or physical range.

9. The method of claim 1, further comprising:
terminating the turbine startup when boundary control parameter does not meet a predetermined value.

10. A system for starting a turbine, the system comprising:
a turbine;
a plurality of sensors operable to receive turbine speed control data and boundary control parameter data;
a processor operable to receive turbine speed control data and turbine boundary control parameter data; and
at least one control valve operable to adjust the control valve position and control steamflow entering the turbine, wherein the processor is operable to:
determine the at least one control valve position based on the data received from the sensors monitoring speed; and
determine control valve position based on the data received from the sensors monitoring boundary control parameters; and
adjust at least one boundary control parameter to the at least one boundary control parameter limit during turbine startup, wherein the value of a speed control parameter is simultaneously adjusted based on the adjusted at least one boundary control parameter; and
adjust the control valve position based at least on determined parameter data.

11. The system of claim 10, wherein the processor is operable to compare the determined control valve position based on received boundary control parameter data and the determined control valve position based on received speed control data.

12. The system of claim 11, wherein the processor is further operable to compare the determined control valve position based on received boundary control parameter data and the determined control valve position based on received speed control data, wherein the comparison resultant is determined by the minimum value of the determined control valve positions.

13. The system of claim 10, wherein the processor is operable to adjust the control valve position based at least on the speed control parameter, wherein the speed control parameter is determined independently from the boundary control parameter data.

14. The system of claim 10, wherein the processor is operable to adjust the control valve position based at least on determined parameter data, wherein the determined parameter data can include: the determined control valve position based on received boundary control parameter data, the adjusted at least one boundary control parameter, determined control valve position based on received speed control parameter data, and the adjusted speed control parameter.

15. The system of claim 10, wherein the processor is operable to implement a speed control parameter that is determined by a comparison between the actual speed and reference speed.

16. The system of claim 10, wherein the processor is operable to implement a boundary control parameter that is based on a physical or operational requirement of the turbine.

17. The system of claim 16, wherein the processor is further operable to implement a boundary control parameters comprising at least one of: axial thrust, rotor stress, steam pressure, or physical range.

18. The system of claim 10, wherein the processor is further operable to terminate the turbine startup when the boundary control parameter does not meet specified value.

19. One or more non-transitory computer-readable media storing computer-executable instructions that, when executed by at least one processor, configure at least one processor to perform operations comprising:
receiving an indication the turbine is in an initial acceleration phase;
receiving speed control parameter data from a plurality of sensors;
receiving boundary control parameter data from a plurality of sensors;
providing a control valve configured for controlling steam flow entering the turbine;
determining the control valve position based on received speed control parameter data;
determining the control valve position based on received boundary control parameter data;
adjusting at least one boundary control parameter to the at least one boundary control parameter limit during turbine startup, wherein the value of a speed control parameter is simultaneously adjusted based on the adjusted at least one boundary control parameter; and
adjusting the control valve position based at least on determined parameter data.

20. The one or more non-transitory computer-readable media of claim 19, wherein the processor is further operable to perform operations comprising:
terminating turbine startup when boundary control parameter does not meet a predetermined value.

* * * * *